US009392416B2

United States Patent
Sridhar et al.

(10) Patent No.: US 9,392,416 B2
(45) Date of Patent: Jul. 12, 2016

(54) METHOD AND APPARATUS FOR PREDICTING AND PRE-FETCHING LOCATION INFORMATION

(75) Inventors: Muralidhar Kolar Sridhar, Bangalore (IN); Sankar Kumar Sk, Bangalore (IN); Ari Tourunen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 55 days.

(21) Appl. No.: 13/990,178

(22) PCT Filed: Sep. 28, 2011

(86) PCT No.: PCT/FI2011/050836
§ 371 (c)(1),
(2), (4) Date: Jul. 10, 2013

(87) PCT Pub. No.: WO2012/072862
PCT Pub. Date: Jun. 7, 2012

(65) Prior Publication Data
US 2014/0073358 A1 Mar. 13, 2014

(30) Foreign Application Priority Data

Nov. 30, 2010 (IN) .......................... 3634/CHE/2010

(51) Int. Cl.
*H04W 4/02* (2009.01)
*G06F 17/30* (2006.01)
*H04W 4/04* (2009.01)
*G01C 21/36* (2006.01)
*H04L 29/08* (2006.01)

(52) U.S. Cl.
CPC ........... *H04W 4/028* (2013.01); *G01C 21/3679* (2013.01); *G06F 17/30241* (2013.01); *H04L 67/2842* (2013.01); *H04W 4/04* (2013.01)

(58) Field of Classification Search
CPC ......... H04W 4/02; H04W 4/028; H04W 4/04; H04W 64/00
USPC ........................ 455/418, 456.1, 456.3, 456.5
See application file for complete search history.

(56) References Cited

U.S. PATENT DOCUMENTS

| 2005/0114021 A1 | 5/2005 | Krull et al. |
| 2009/0222482 A1 | 9/2009 | Klassen et al. |
| 2009/0291693 A1 | 11/2009 | Kim et al. |

(Continued)

FOREIGN PATENT DOCUMENTS

| EP | 2199928 | 6/2010 |
| WO | 2008134223 | 11/2008 |
| WO | 2008140881 | 11/2008 |

OTHER PUBLICATIONS

International Search Report received for corresponding Patent Cooperation Treaty Application No. PCT/FI2011/050836, dated Jan. 13, 2012, 4 pages.

(Continued)

*Primary Examiner* — Sam Bhattacharya
(74) *Attorney, Agent, or Firm* — Ditthavong & Steiner, P.C.

(57) ABSTRACT

An approach is provided for predicting and pre-fetching location information. A pre-fetching manager determines a predicted location associated with a device. Next, the pre-fetching manager retrieves location information based, at least in part, on the predicted location. Then, the pre-fetching manager determines to cache the location information at the device.

21 Claims, 10 Drawing Sheets

(56) References Cited

U.S. PATENT DOCUMENTS

2009/0315995 A1  12/2009  Khosravy et al.
2009/0319181 A1  12/2009  Khosravy et al.

OTHER PUBLICATIONS

Extended European Search Report received for corresponding European Patent Application No. 11844283.9, dated Aug. 27, 2014, 8 pages.

METHOD AND APPARATUS FOR PREDICTING AND PRE-FETCHING LOCATION INFORMATION

RELATED APPLICATION

This application was originally filed as PCT Application No. PCT/FI2011/050836 filed Sep. 28, 2011 and which claims priority to Indian Patent Application No. 3634/CHE/2010 filed on Nov. 30, 2010 which is incorporated herein by reference in its entirety.

BACKGROUND

Service providers and device manufacturers (e.g., wireless, cellular, etc.) are continually challenged to deliver value and convenience to consumers by, for example, providing compelling network services. One area of development has been the use of reverse geo-coding services to provide users with location information that they can understand. For example, these services may convert geographic coordinates to names of places (e.g., points of interest (POIs)), street addresses, neighborhoods, cities/towns, counties/provinces, states, or countries, etc. Such conversions enhance the user experience by making the information that is eventually presented to the user more comprehendible. However, the process of obtaining the geographic coordinates and thereafter translating the geographic coordinates into user-friendly information can take what the user may believe to be a significant amount of time. Consequently, the user may perceive that the performance of the service or the device to be poor, causing the user to be frustrated or disappointed with the service or the device. Accordingly, service providers and device manufacturers face significant technical challenges in providing users with location information that is easier to understand.

SOME EXAMPLE EMBODIMENTS

Therefore, there is a need for an approach for predicting and pre-fetching location information.

According to one embodiment, a method comprises facilitating a creation and/or a modification of at least one device user interface element, at least one device user interface functionality, or a combination thereof based, at least in part, on data and/or at least one signal resulting from a local and/or remote determination of a predicted location associated with a device. The data and/or the at least one signal also result from a local and/or remote determination to retrieve location information based, at least in part, on the predicted location. The data and/or the at least one signal further result from a local and/or remote determination to cache the location information at the device.

According to one embodiment, a method comprises determining a predicted location associated with a device. The method also comprises determining to retrieve location information based, at least in part, on the predicted location. The method further comprises determining to cache the location information at the device.

According to another embodiment, an apparatus comprises at least one processor, and at least one memory including computer program code, the at least one memory and the computer program code configured to, with the at least one processor, cause, at least in part, the apparatus to determine a predicted location associated with a device. The apparatus is also caused to determine to retrieve location information based, at least in part, on the predicted location. The apparatus is further caused to determine to cache the location information at the device.

According to another embodiment, a computer-readable storage medium carries one or more sequences of one or more instructions which, when executed by one or more processors, cause, at least in part, an apparatus to determine a predicted location associated with a device. The apparatus is also caused to determine to retrieve location information based, at least in part, on the predicted location. The apparatus is further caused to determine to cache the location information at the device.

According to another embodiment, an apparatus comprises means for determining a predicted location associated with a device. The apparatus also comprises means for determining to retrieve location information based, at least in part, on the predicted location. The apparatus further comprises means for determining to cache the location information at the device.

According to another embodiment, a computer program product including one or more sequences of one or more instructions which, when executed by one or more processors, cause an apparatus to determine a predicted location associated with a device. The apparatus is also caused to determine to retrieve location information based, at least in part, on the predicted location. The apparatus is further caused to determine to cache the location information at the device.

According to another embodiment, a method comprising facilitating access to at least one interface configured to allow access to at least one service, the at least one service configured to determine a predicted location associated with a device. The service is also configured to determine to retrieve location information based, at least in part, on the predicted location. The service is further configured to determine to cache the location information at the device.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for pre-fetching location information are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to pre-fetching reverse geo-coding information, it is contemplated that the approach described herein is applicable to pre-fetching any other type of location information, including, but not limited to, images, videos, articles, people, places, etc., associated with a location.

Figure 1:
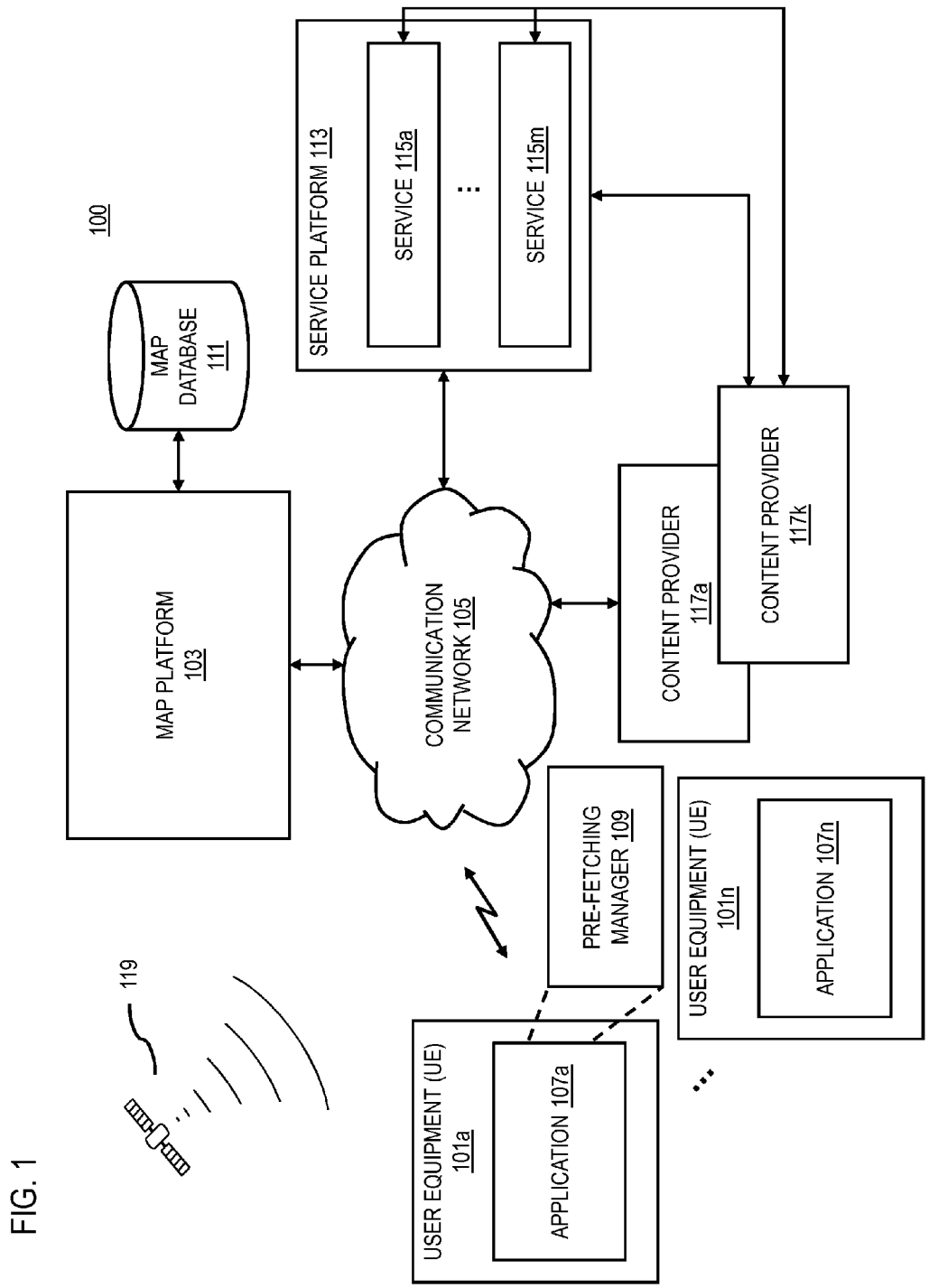
FIG. 1 is a diagram of a system capable of predicting and pre-fetching location information, according to one embodiment.

FIG. 1 is a diagram of a system capable of pre-fetching location information, according to one embodiment. It is becoming increasingly popular for service providers and device manufacturers to bundle or make available navigation and mapping services on an array of user devices (e.g., mobile handsets, computers, navigation devices, etc.). Such devices may utilize location-based technologies (e.g., Global Positioning System (GPS) receivers, cellular triangulation, assisted-GPS (A-GPS), etc.) to provide navigation and mapping information. One growing trend is the use of reverse geo-coding services to provide users with location information that they can understand. These services may receive geographic coordinates from manual input by a user, a GPS receiver, or a selection of a point on an interactive map and then present those coordinates to the user in the form of place names (e.g., points of interest (POIs)), street addresses, neighborhoods, city/town names, county names, state/province names, country names, etc. As mentioned, such conversions enhance the user experience by making the information that is eventually presented to the user easier to understand. However, the latency that occurs during such process may affect the experience of the user. For example, the process of obtaining the geographic coordinates and thereafter translating the geographic coordinates into user-comprehendible information can take what the user may believe to be a significant amount of time. As a result, the user may become turned off by the feature because of the poor performance perceived by the user. In addition, it is noted that a user's perception with respect to the performance of services, features, devices, and the like, also exists for the retrieval of other location information, such as images, videos, articles, people, places, etc., associated with a location.

To address this problem, a system 100 of FIG. 1 introduces the capability to pre-fetch location information by predicting a location, retrieving the location information, and caching the location information for current or future use. More specifically, the system 100 may reduce the reverse geo-coding latency by predicting and pre-fetching reversed geo-coded information at specific events and store them for fast retrieval either immediately or at a later time. For example, the predicting and pre-fetching of the reverse geo-coded information may occur during an initial use of the device, an activation of the device, a change in an online status of the device, a change in an operator network associated with the device, etc. In addition, because it is understood that not every reverse geo-coded information with respect to the future location of the device will be captured by the predicting and pre-fetching process (e.g., due to inaccurate prediction), the system 100 may also pre-fetch hierarchically lower accuracy positions at the time of every high accuracy pre-fetch (e.g., pre-fetch the state/province view in addition to the street view). Accordingly, when a request for reverse geo-coded information of the current location of the device occurs, the system 100 may display the highest accuracy level information available in the cache memory and launch reverse geo-coding requests for the current location hierarchically (e.g., based on accuracy levels). As the requested reverse geo-coded information becomes available to the device, the lower accuracy reverse geo-coded information currently being presented to the user may immediately be replaced with higher accuracy reverse geo-coded information to reduce the amount of time that a user has to wait for the next update. At the same time, the system 100 may predict future locations of the device based on the current location and pre-fetch reverse geo-coded information based on the predicted locations to be stored for current or later use.

By way of example, a tourist visiting the Statue of Liberty may turn on a device, for instance, to take pictures. As this may be the first time the tourist has visited the area, the cache memory may not contain precise location information with respect to the tourist's current location. Nevertheless, because of a previous prediction and hierarchical pre-fetch of the location information based on the prediction, the cache memory may contain location information with lower accuracy levels. As such, if the current location is "Liberty Island, N.Y., United States" (e.g., geographic coordinates [40.702864, −74.014326]), the cache memory may contain "New York, United States" based on the earlier prediction and hierarchical pre-fetch. Accordingly, "New York, United States" is immediately presented to the user to provide a perception of an Always Available Location, while reverse geo-coding requests are made hierarchically for the current location (e.g., reverse geo-coding requests for geographic coordinates [40.7028, −74.0143], and [40.702864, −74.014326]). In this situation, reverse geo-coded information results would likely be obtained by the device in this order (e.g., high to low accuracy level information): (1) "Liberty Island, N.Y., United States"; (2) "Ellis Island, N.Y."; (3) "New York, United States". As a result, as soon as "Ellis Island, N.Y., United States" becomes available, it immediately replaces "New York, United States". In one embodiment, all or a portion of the hierarchically determined reverse geo-coded information can be cached for future use. In this way, even though the overall latency may not have been reduced in this particular situation, the user's perception of the device's performance may be a positive one because there was less wait time in between updates. In addition, during this process, the device may predict future locations of the device based on the geographic coordinates of the current location and the information provided by the surrounding area (e.g., neighbouring cell information). Subsequently, the device may pre-fetch reverse geo-coded information based on the predicted locations to be stored for current or later use. That way, not only will there be a positive perception as to the performance, but the overall latency will also be reduced if there is a sufficiently accurate prediction.

More specifically, the system 100 may determine a predicted location associated with a device. The predicted location may include any indicator, data, and/or information to identify characteristics of a current and/or future location of the device such that the system 100 may pre-fetch or retrieve any location information (e.g., reverse geo-coded information, geo-tagged data, etc.) that might be used at the device. For example, the predicted location may be expressed as coordinates, other geo-coded information, place names, etc., and at any level of accuracy. The system 100 may then retrieve location information based on the predicted location. As previously discussed, the location information may be retrieved from a memory associated with the device (e.g., cached location information) for immediate retrieval or from other components of the system 100, for instance, by simultaneously requesting information based on a hierarchy of accuracy levels. After the retrieval process, the system 100 may further cache the location information at the device for current or later use.

As shown in FIG. 1, the system 100 comprises a user equipment (UE) 101 (or UEs 101 or UEs 101a-101n) having connectivity to a map platform 103 via a communication network 105. The location information may be utilized by applications 107 of the UE 101 (e.g., location-based applications). The applications 107 may also include or have access to a pre-fetching manager 109 to predict and pre-fetch the location information. It is noted that the pre-fetching manager 109 may be included with the UE 101 as shown, or the pre-fetching manager 109 may be provided and handled by the map platform 103. Moreover, mapping information, such as location information, may be included in a map database 111 associated with the map platform 103 for access by the applications 107. As discussed, mapping information may be retrieved from the map database 111 to be utilized by the applications 107 of the UE 101.

In certain embodiments, mapping information may be associated with content information including live media (e.g., streaming broadcasts), stored media (e.g., stored on a network or locally), metadata associated with media, text information, location information of other user devices, or a combination thereof. The content may be provided by the service platform 113 which includes one or more services 115a-115m (e.g., music service, mapping service, video service, social networking service, content broadcasting service, etc.), one or more content providers 117a-117k (e.g., online content retailers, public databases, etc.), other content source available or accessible over the communication network 105. For example, the applications 107 may present location-related content information (e.g., content with regard to images, videos, articles, people, places, etc., associated with a location) on a display of the UE 101 in addition or as an alternate to reverse geo-coded information and/or other mapping information.

As mentioned, the UE 101 may utilize location-based technologies (GPS receivers, cellular triangulation, A-GPS, etc.) to provide mapping information. For instance, the UE 101 may include a GPS receiver to obtain geographic coordinates from satellites 119 to determine the current location associated with the UE 101. In one sample use case, a user lands at the local airport near his home from a long-distance business trip. Based on the geographic coordinates received from the satellites 119, a particular application 107 will check via the pre-fetching manager 109 whether the location information (e.g., reverse geo-coded information) for the current location is available in the memory of the UE 101. Assuming that the user had previously departed from the local airport, the pre-fetching manager 109 may have predicted that the user would return, for instance, based on calendar entries on the user's UE 101. Thus, in this case, accurate location information of the user's current location will most likely be stored in the memory of the UE 101. As a result, the cached location information may immediately be presented to the user, reducing the overall latency time. In addition, it is noted that the application may also store location information with regard to the user's home location, or other favorite areas, as those areas may be places that the user frequently visits. As such, a table of well-known areas may be maintained where predicting and pre-fetching has already been done. In these well-known areas, the pre-fetching manager 109 may determine not to predict or pre-fetch to conserve resources, such as processor availability and battery life.

In another sample use case, the user lands at a foreign airport where the user has not been before. In this case, on activation of the UE 101 (e.g., turning on, entering a new cellular network, etc.), the pre-fetching manager 109 may attempt to obtain location at the best accuracy possible. For example, while inside the airport, the UE 101 may not have GPS satellite reception, and therefore may determine location information based on, for instance, cell-ID information. Based on this location information, the pre-fetching manager 109 can predict what locations the UE 101 is likely to go to from the airport and then pre-fetch the corresponding location information (e.g., reverse geo-code information) that might be needed by one or more applications (e.g., application 107) executing on the UE 101. In addition or alternatively, the pre-fetching manager 109 can use other context information (e.g., calendar information, search activity at the UE 101, etc.) to predict and anticipate that the user will be travelling to the foreign airport and then begin caching corresponding location information at the UE 101 even before the user has arrived at the foreign airport. As with the above example, such prediction and pre-fetching of location information can advantageously reduce latency in providing the location information to the user via, e.g., the application 107.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In another embodiment, the pre-fetching manager 109 may generate a hierarchy of the location information with respect to a plurality of accuracy levels. The plurality of accuracy levels of the hierarchy may, for instance, be associated with respective granularities of the predicted location. By way of example, the desired location information may be with respect to a POI. Thus, based on the plurality of accuracy levels, the retrieval of the location information (e.g., the POI) may include, for instance, the country view, the state/province view, the city/town view, the street view, a photo of the POI, etc.

In another embodiment, the pre-fetching manager 109 may receive a request for a portion of the location information, wherein the request specifies a determined location of the device. As mentioned, the request may specify the determined location (e.g., current location) through, for instance, geographic coordinates obtained by a GPS receiver located at the device (e.g., the UE 101). With respect to reverse geo-coded information, the portion may include "the name of the country", "the names of the country and the state/province", "the names of the country, the state/province, and the city/town", etc. In a further embodiment, the pre-fetching manager 109 may determine the portion of the location information based on the determined location, an accuracy associated with the determined location, or a combination thereof. For example, the country name by itself may be associated with the lowest accuracy level of the generated hierarchy, while the combination of the street address, the city/town name, the state/province name, and the country name may be associated with the highest accuracy level of the generated hierarchy.

In another embodiment, the pre-fetching manager 109 may determine a change to the accuracy associated with the determined location. As discussed above, the pre-fetching manager 109 may initially present to the user of the UE 101 the first available portion of the location information (e.g., the state/province name). However, because the pre-fetching manager 109 may make requests for a plurality of portions of the location information based on the plurality of accuracy levels, other portions of the location information associated with other accuracy levels (e.g., the country name, the city/town name, the street address, etc.) may be retrieved at a later time and thus will become available for presentation to the user. Accordingly, in a further embodiment, the pre-fetching manager 109 may update the portion of the location information based on the change. In this way, the pre-fetching manager 108 may improve the user's perceived performance by replacing the portion of the location information currently being display to the user with a portion of the location information associated with a higher accuracy level (e.g., less wait time between updates seen by the user).

In another embodiment, the pre-fetching manager 109 may determine a location of the device, context information associated with the device, or a combination thereof. The context information associated with the device may include calendar entries, task lists, day planners, user habits, etc. In a further embodiment, the pre-fetching manager 109 may determine the predicted location based on a current location of the device, context information associated with the device, a history of locations associated with the device, or a combination thereof. For example, calendar entries may include location information that may be helpful in predicting the user's location on a particular day and time, such as flight or trip information. As such, calendar entries would be useful in determining the predicted location.

In another embodiment, the pre-fetching manager 109 may determine a planned route of travel based on an application, a service, or a combination thereof associated with the device. By way of example, the applications 107 of the UE 101 may include a navigational application. The user may enter a destination address into the navigational application, which may result in the navigational application providing routing instructions to the user. Thus, the pre-fetching manager 109 may utilize the routing instructions to determine the user's planned route of travel. As such, in a further embodiment, the pre-fetching manager 109 may determine the predicted location based on the planned route of travel. By utilizing the routing instructions in addition to the speed of travel, the direction of travel, etc., provided, for instance, by the navigational application, the pre-fetching manager 109 may be able to improve the accuracy of its determination as to the predicted location of the user of the UE 101.

In another embodiment, the pre-fetching manager 109 may determine an event associated with the device. For example, the event may include an initial use of the device, an activation of the device, a change in an online status of the device, a change in an operator network associated with the device, or a combination thereof. The occurrence of such events may be useful (e.g., to indicate a significant distance movement), for instance, in determining the predicted location of the device, retrieving the location information based on the predicted location, and/or caching the location information for current or later use. As such, in a further embodiment, the pre-fetching manager 109 may cause actions that result in the predicted location being determined, the location information being retrieved, the location information being cached, or a combination thereof based on the event. In addition, using particular events as conditions or triggers to perform steps related to predicting and pre-fetching of location information (as opposed to continuous performing such steps) may help the device conserve resources, such as processor availability and battery life.

In another embodiment, the pre-fetching manager 109 may determine one or more location-based applications executing at the device. The one or more location-based applications may include, for instance, a navigational application for route planning. As discussed above, the user may utilize the navigational application located on the device to obtain routing information to a desired destination address. While the navigational application is being utilized by the user, it may be able to provide additional information such as the speed of travel, the direction of travel, etc. By way of an example, the pre-fetching manager 109 may use the routing information, the destination address, the speed of travel, and the direction of travel to improved accuracy of the determination of the predicted location. In addition, the pre-fetching manager 109 may use the routing information and the destination address to determine one or more portions of the location information. Accordingly, in a further embodiment, the pre-fetching manager 109 may determine the predicted location, at least a portion of the location information, or a combination thereof based on the one or more location-based applications.

In another embodiment, the pre-fetching manager 109 may act on an execution of one or more location-based applications. In yet another embodiment, the pre-fetching manager 109 may determine at least a portion of the location information based on available information regarding a current location of the device. In a further embodiment, the pre-fetching manager 109 may further provide the at least a portion of the location information to the one or more location-based applications. As discussed above, the applications 107 of the UE 101 may include a navigational application that provides routing information to users. So as to avoid the unnecessary use of resources, the pre-fetching manager 109 may provide the portion (or portions) of the location information that it has determined. For example, as the navigational application provides real-time routing instructions, the pre-fetching manager 109 may provide the user with the names of streets, cities/towns, etc., that the user is currently in.

In another embodiment, the pre-fetching manager 109 may determine respective activity states of the one or more location-based applications. For example, with regard to a navigational application, the pre-fetching manager 109 may determine, for instance, whether the navigational application is executing, whether the navigational application is being queried for routing information, whether the navigational application detects movement or direction, whether the navigational application is in particular modes (e.g., augmented reality mode), etc. In a further embodiment, the pre-fetching application 109 may cause actions that result in the at least a portion of the location information being determined, the at least a portion of the location information being provided, or a combination thereof based on the respective activity states. By way of example, when the navigational application is in augmented reality mode, the pre-fetching manager 109 may provide the navigational application with reverse geo-coded information, such as place names or street names, or with access to geo-tagged data, such as images, videos, articles, etc. As such, the use of the pre-fetching manager 109 to provide the location information to the one or more location-based applications helps avoid the unnecessary use of resources.

By way of example, the UE 101, map platform 103, the service platform 113, and the content providers 117a-117k communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
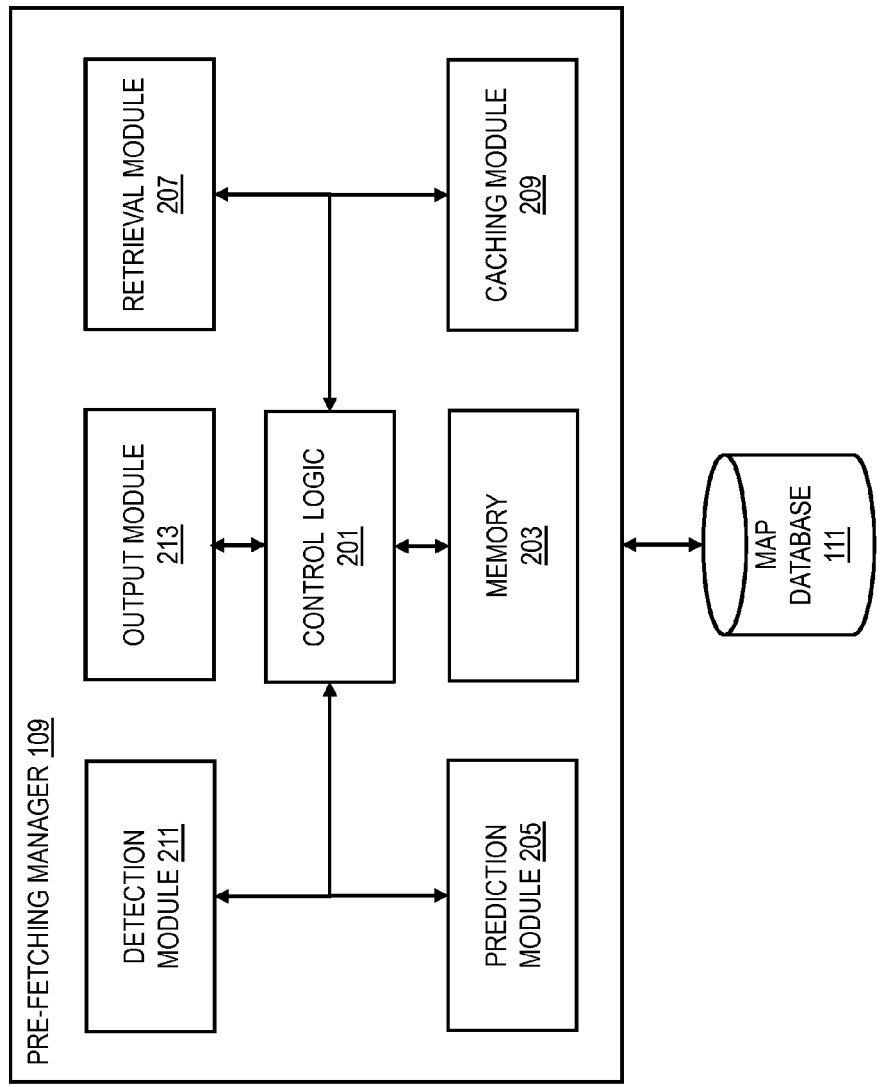
FIG. 2 is a diagram of the components of a pre-fetching manager, according to one embodiment.

FIG. 2 is a diagram of the components of a pre-fetching manager, according to one embodiment. By way of example, the pre-fetching manager 109 includes one or more components for pre-fetching location information. It is contemplated that the functions of these components may be combined in one or more components or performed by other components of equivalent functionality. In this embodiment, the pre-fetching manager 109 includes control logic 201, a memory 203, a prediction module 205, a retrieval module 207, a caching module 209, and a detection module 211.

The control logic 201 oversees tasks, including tasks performed by the prediction module 205, the retrieval module 207, the caching module 209, and the detection module 211. For example, although the other modules may perform the actual task, the control logic 201 may determine when and how those tasks are performed or otherwise direct the other modules to perform the task.

The prediction module 205 determines the predicted location associated with the UE 101. In one embodiment, the prediction module 205 may determine the predicted location based on the current location of the UE 101. In another embodiment, the determination of the predicted information may be based on information that may be readily available at applications 107 of the UE 101, such as a navigational application. The information that the navigational application may provide include routing information, destination address, speed of travel, direction of travel, etc. The prediction module 205 may incorporate such information in its determination process to improve the accuracy of the predicted location.

Moreover, the prediction module 205 may work with the detection module 211 to determine when a predicted location should be determined, for instance, in order to conserve resources, such as processor availability and battery life. The detection module 211 may identify whether certain conditions or triggers have been met, such as whether a particular event has occurred (e.g., the movement or change of direction of the UE 101), before instructing the prediction module 205 to determine a predicted location. The detection module 211 may also cooperate with the retrieval module 207 and the caching module 209 to determine, for instance, whether the retrieval module 207 or the caching module should act based on the detection of the conditions or triggers.

The retrieval module 207 retrieves location information based on the predicted location, and thus, interacts with the prediction module 205 to perform such tasks. The retrieval module may obtain the location information from the memory 203, the map database 111, or any other components of the system 100. The retrieval module 207 may determine whether to retrieve the location information from the memory 203, the map database 111, other components of the system 100, or a combination thereof based on a number of factors, such as whether the location information is already cached, the availability of resources, recommendations by the detection module 211, etc.

The caching module 209 caches the location information in the memory 203 (or another memory at the UE 101) for current or later use. The caching module 209 may regulate the location information that is stored in the memory 203. For example, the caching module 209 may determine the amount of location information to be stored, which location information should be stored (e.g., depending on frequency, user-defined or automated priority, etc.), the level of accuracy required of location information before it is stored, etc.

In one embodiment, the output module 213 facilitates a creation and/or a modification of at least one device user interface element, at least one device user interface functionality, or a combination thereof based, at least in part, on information, data, messages, and/or signals resulting from any of the processes and or functions of the pre-fetching manager 109 and/or any of its components or modules. By way of example, a device user interface element can be a display window, a prompt, an icon, and/or any other discrete part of the user interface presented at, for instance, the UE 101. In addition, a device user interface functionality refers to any process, action, task, routine, etc. that supports or is triggered by one or more of the user interface elements. For example, user interface functionality may enable speech to text recognition, haptic feedback, and the like. Moreover, it is contemplated that the output module 213 can operate based at least in part on processes, steps, functions, actions, etc. taken locally (e.g., local with respect to a UE 101) or remotely (e.g., over another component of the communication network 105 or other means of connectivity).

Figure 3:
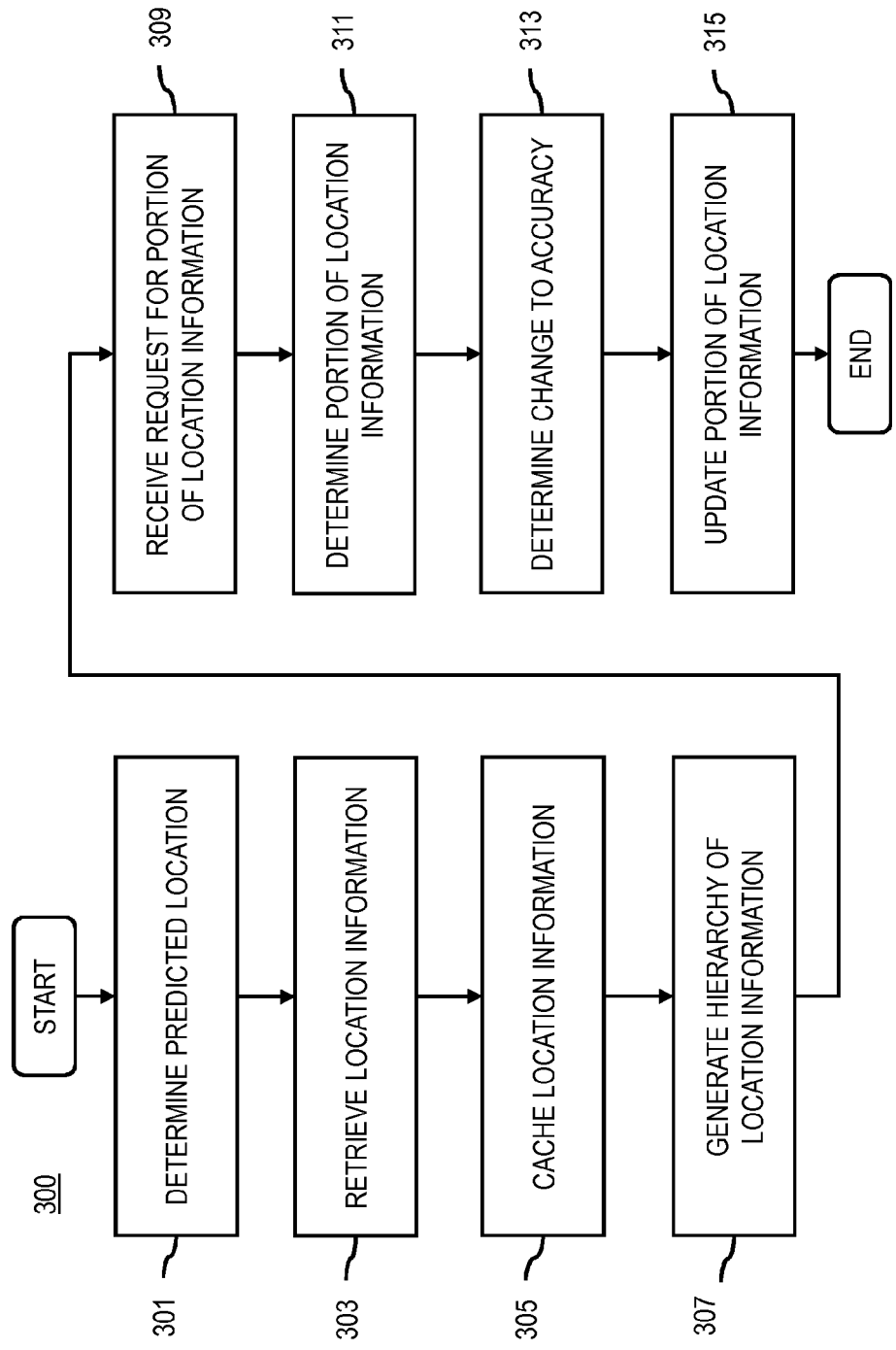
FIG. 3 is a flowchart of a process for pre-fetching location information, according to one embodiment.
Figure 7:
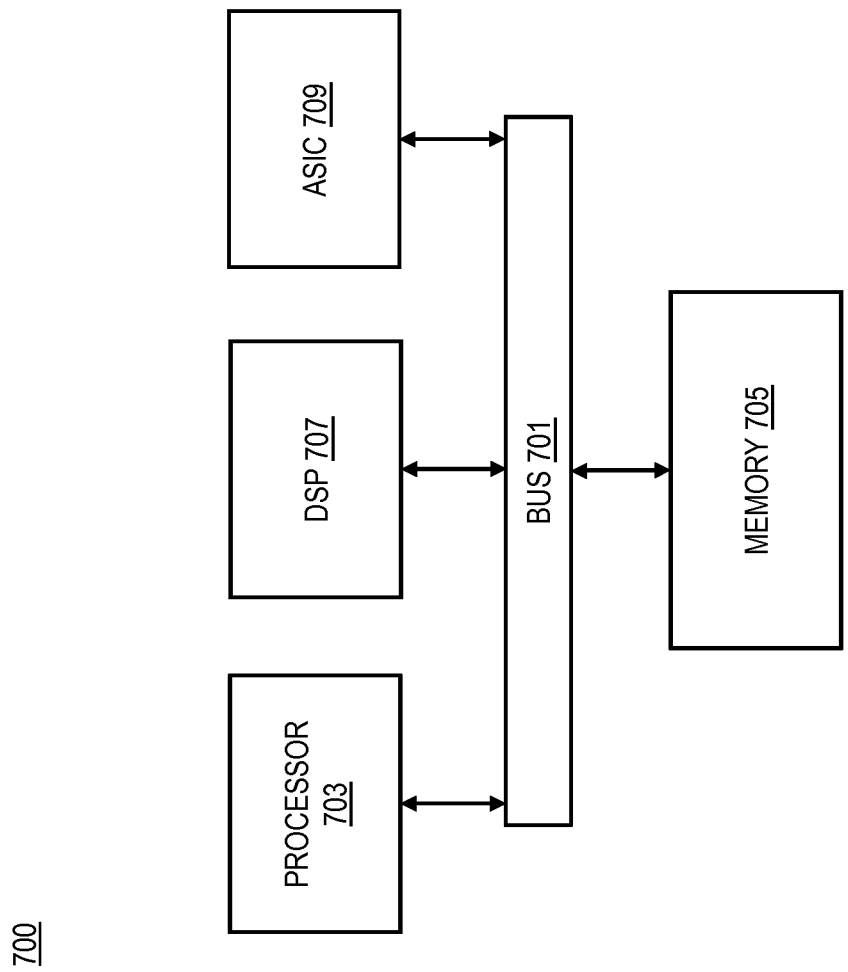
FIG. 7 is a diagram of a chip set that can be used to implement an embodiment of the invention.

FIG. 3 is a flowchart of a process for pre-fetching location information, according to one embodiment. In one embodiment, the pre-fetching manager 109 performs the process 300 and is implemented in, for instance, a chip set including a processor and a memory as shown in FIG. 7. As such, the control logic 201 can provide means for accomplishing various parts of the process 300 as well as means for accomplishing other processes in conjunction with other components of the pre-fetching manager 109.

In step 301, the control logic 201 determines a predicted location associated with a device. As described, the predicted location may include any indicator, data, and/or information to identify characteristics of a current and/or future location of the device such the location information that might be used at the device may be pre-fetched or retrieved based on the predicted location. For example, the predicted location may be expressed as coordinates, other geo-coded information, place names, etc., and at any level of accuracy. In addition, as previously mentioned, the predicted information may be based on the current location, information provided by applications 107 of the UE 101 (e.g., navigational applications), conditions or triggering events, locations or context information associated with the device, (e.g., calendar entries), etc.

In step 303, the control logic 201 may determine to retrieve location information based, at least in part, on the predicted location. The location information may be retrieved from the memory 203 (or other memories at the device), from the map platform 103, or other components of the system 100. If the location information is not available in the memory 203, the location information may have to be retrieved from the map platform 103 (or the other components). However, even if the memory 203 contains the location information, the control logic 201 may still obtain other location information associated with lower accuracy levels from the map platform 103 (as described in step 307). After the location information is obtained, the control logic 201 may then, as in step 305, determine to cache the location information at the device for current or later use.

In step 307, the control logic 201 may determine to generate a hierarchy of the location information with respect to a plurality of accuracy levels. The plurality of accuracy levels of the hierarchy may, for instance, be associated with respective granularities of the predicted location. By way of example, the desired location information may be with respect to a POI. Thus, based on the plurality of accuracy levels, the retrieval of the location information (e.g., the POI) may include the retrieval of the country view, the state/province view, the city/town view, the street view, a photo of the POI, etc.

In step 309, the control logic 201 may receive a request for at least a portion of the location information, the request specifying at least in part a determined location of the device. The request may specify the determined location in a number of ways, including geographic coordinates (e.g., a GPS receiver), captured photo or video, place names, etc. With respect to reverse geo-coded information, the portion may include "the name of the country", "the name of the country and the state/province", "the name of the country, the state/province, and the city/town", etc. The control logic 201 may then, as in step 311, determine the at least a portion of the location information based, at least in part, on the determined location, an accuracy associated with the determined location, or a combination thereof. For example, the country name by itself may be associated with the lowest accuracy level of the generated hierarchy, while the combination of the street address, the city/town name, the state/province name, and the country name may be associated with the highest accuracy level of the generated hierarchy.

In step 313, the control logic 201 may determine at least one change to the accuracy associated with the determined location. As discussed above, the user may initially be presented with the first available portion of the location information (e.g., the state/province name). However, because requests for a plurality of portions of the location information based on the plurality of accuracy levels may be made, other portions of the location information associated with other accuracy levels (e.g., the country name, the city/town name, the street address, etc.) may be retrieved at a later time and thus will become available for presentation to the user. Accordingly, the control logic 201 may, as in step 315, determine to update the at least a portion of the location information based, at least in part, on the at least one change. In this way, the wait time between each update is reduced by replacing the portion of the location information currently being display to the user with a portion of the location information associated with a higher accuracy level. Thus, each update may hold the user's attention to the application or the device, improving user perceived performance.

Figure 4:
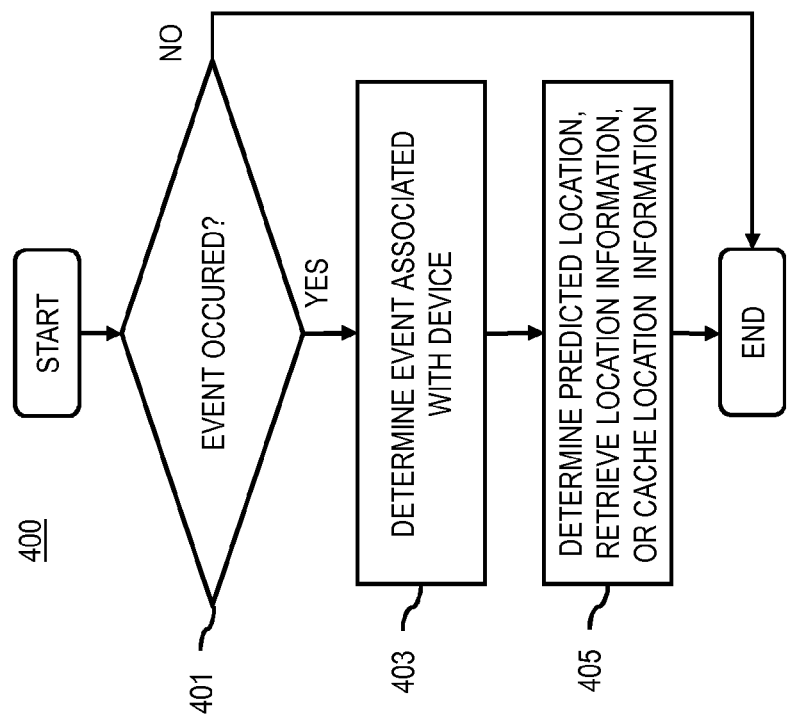
FIG. 4 is a flowchart of a process for predicting location information, according to various embodiments.

FIG. 4 is a flowchart of a process for predicting location information, according to one embodiment. In one embodiment, the pre-fetching manager 109 performs the process 300 and is implemented in, for instance, a chip set including a processor and a memory as shown in FIG. 7. As such, the control logic 201 can provide means for accomplishing various parts of the process 400 as well as means for accomplishing other processes in conjunction with other components of the pre-fetching manager 109.

In step 401, the control logic 201 determines whether an event has occurred. If an event has been detected, then the control logic 201 may then, as in step 403, determine the event associated with the device. The event may include an initial use of the device, an activation of the device, a change in an online status of the device, a change in an operator network associated with the device, or a combination thereof. Depending on the determination of the event, the control logic 201 may further, as in step 405, determine to cause, at least in part, actions that result in the determination of the predicted location, the determination to retrieve the location information, the determination to cache the location information, or a combination thereof based, at least in part, on the event. As discussed, the fact that actions that may result pursuant to step 405 may be conditioned on the occurrence of particular events may help the device conserve resources, such as processor availability and battery life.

Figure 5A:
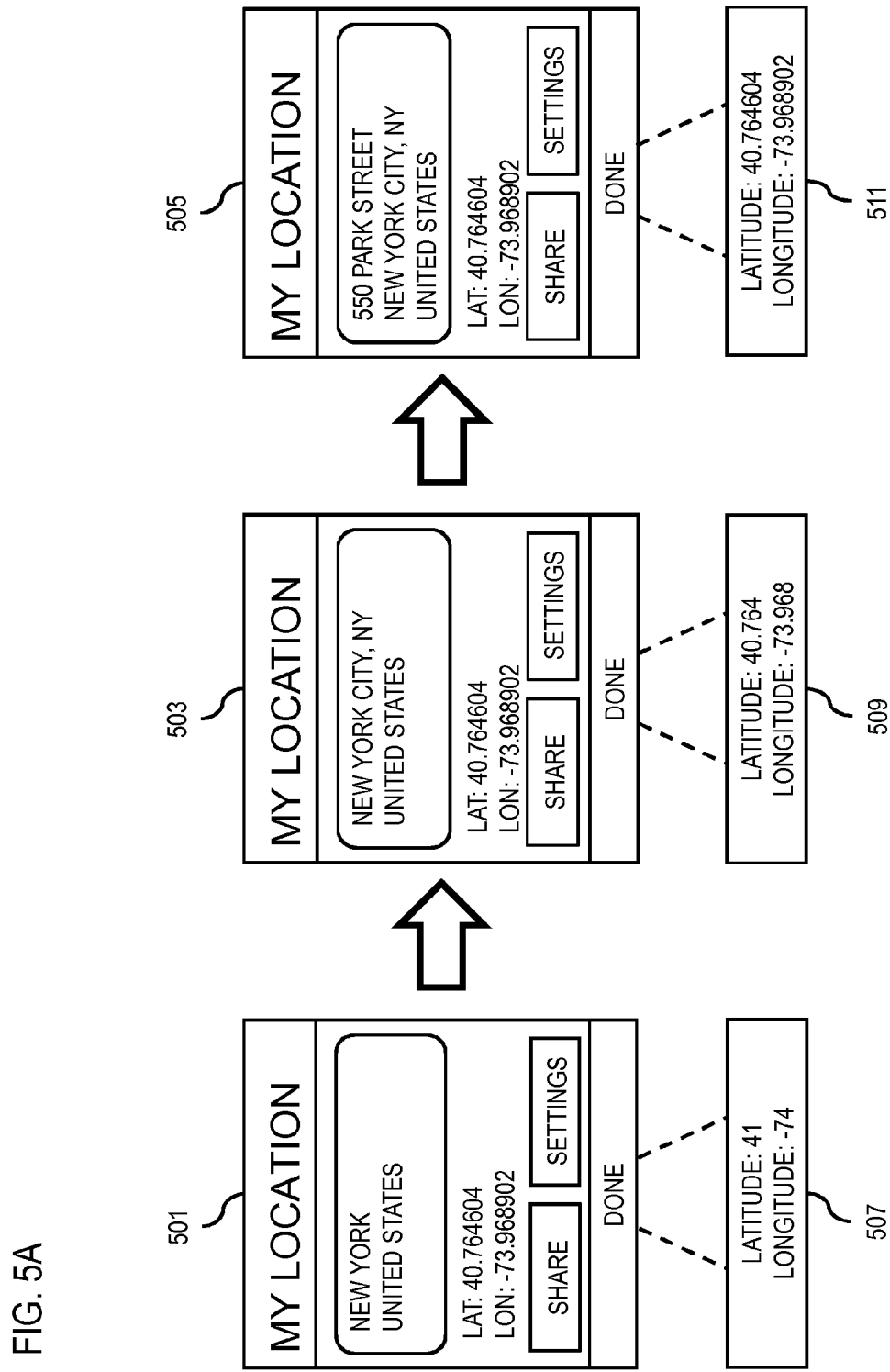
FIG. 5A-5C are diagrams of user interfaces utilized in the processes of FIG. 3, according to various embodiments.
Figure 5B:
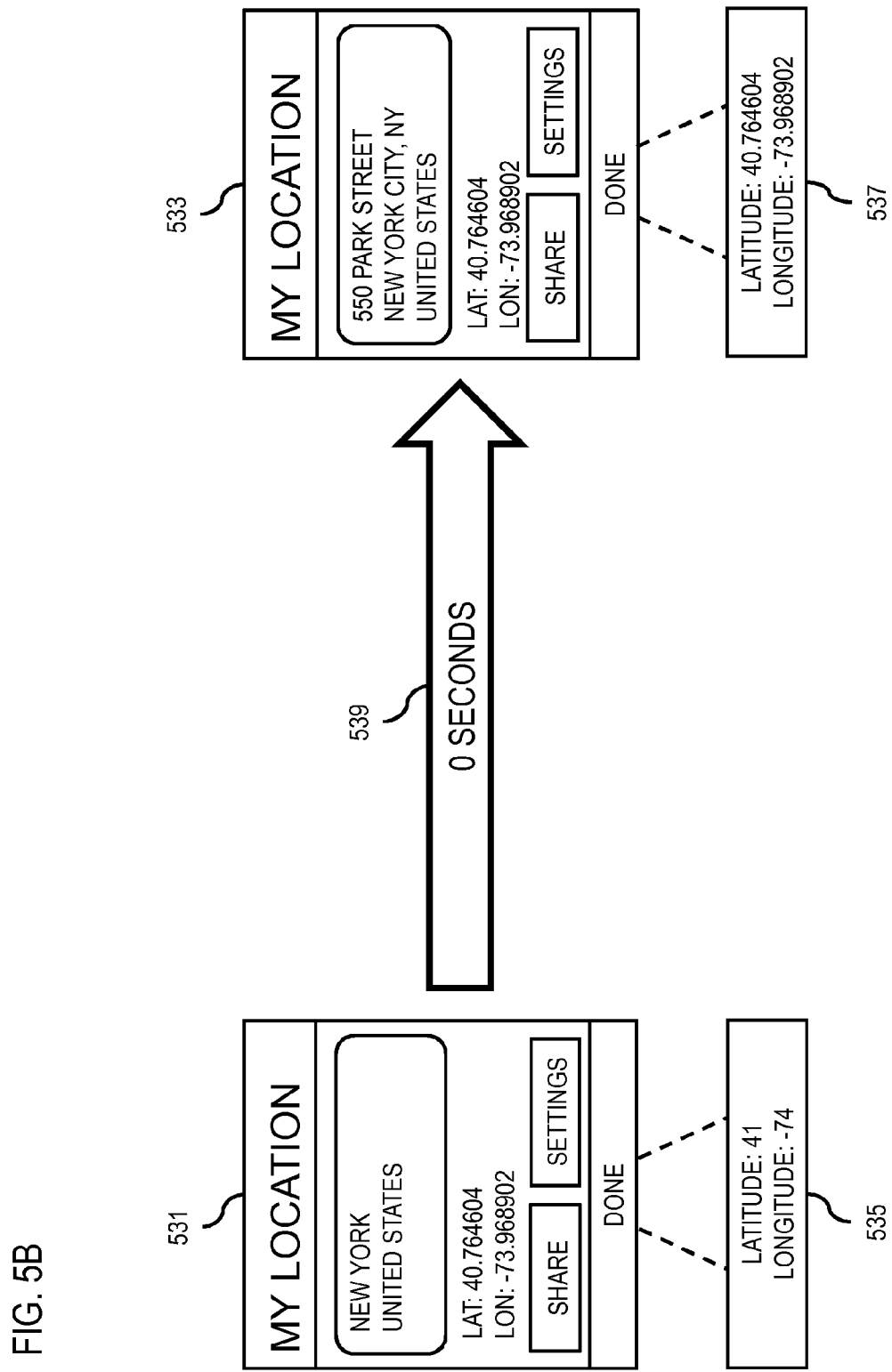
Figure 5C:
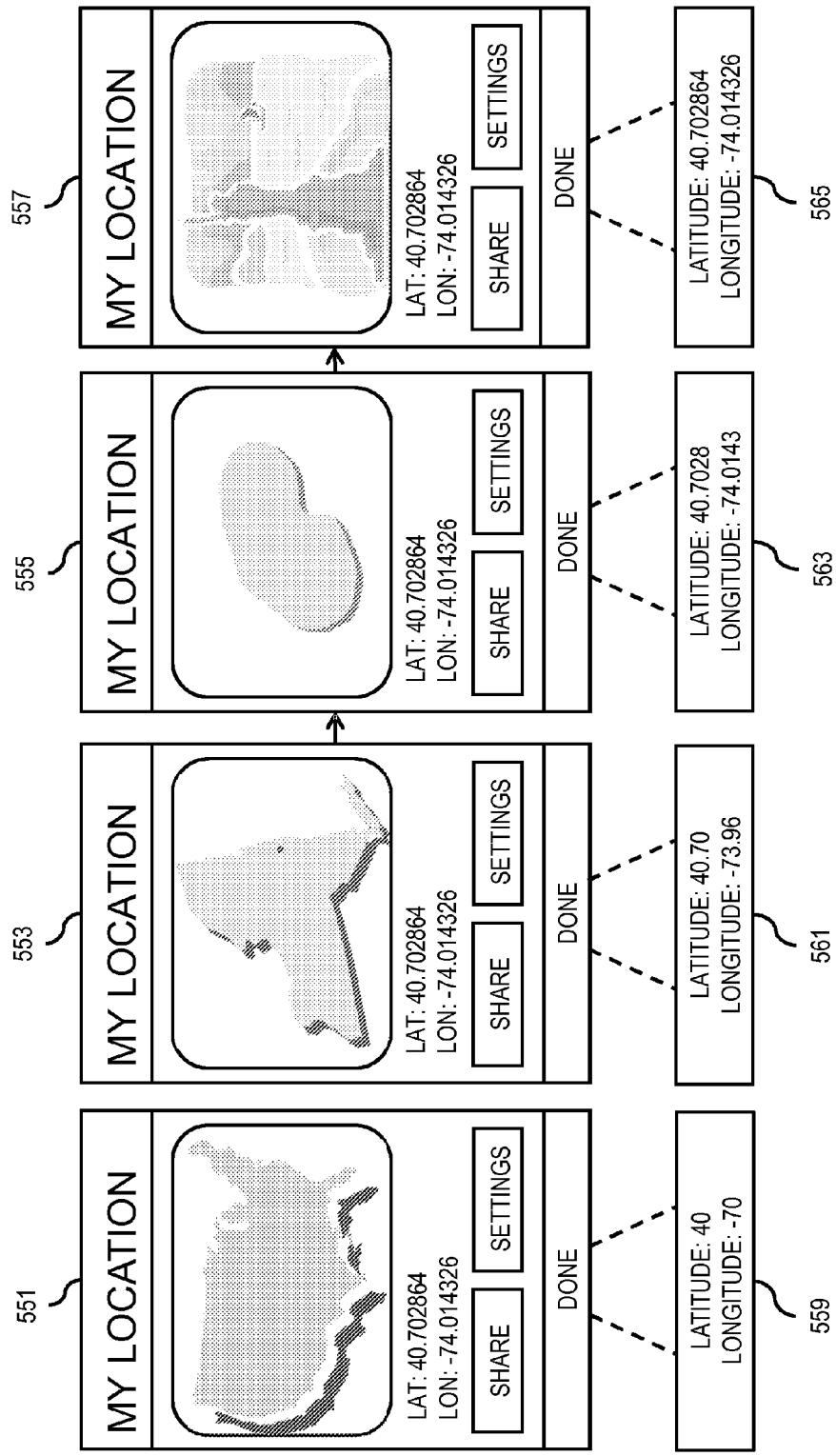

FIGS. 5A-5C are diagrams of user interfaces utilized in the processes of FIG. 3, according to various embodiments. As shown, the example user interfaces of FIGS. 5A-5C include one or more user interface elements and/or functionalities created and/or modified based, at least in part, on information, data, and/or signals resulting from any of the processes (e.g., process 300 and process 400) described with respect to FIGS. 3 and 4. More specifically, FIG. 5A illustrates three user interfaces (e.g., interfaces 501, 503, and 505) and three determined locations with various accuracies (e.g., coordinates 507, 509, and 511). As shown in interface 501, 503, and 505, the user interfaces express the user's current location (e.g., determined location) associated with the device (e.g., obtained through a GPS receiver) in geographic coordinates in decimal format, [40.764604, −73.968902]. In each user interface, the user has the option to change the settings associated with the particular application and to close the application by clicking "Done". Moreover, the user has the ability share the user's reverse geo-coded information. However, the reversed geo-coded information provided is different in each of the interfaces shown.

As shown in interface 501, the highest accuracy level available in the cache memory of the device with respect to portions of the location information for the current location of the device was "New York, United States". As such, simultaneous requests for portions of the location information (e.g., reversed geo-coded information) were made with respect to determined locations with varying accuracies so that the portion of the location information associated with the highest available accuracy at any particular time would be displayed to the user. It is noted that an indicator (not shown) illustrating that higher accuracy portions are being retrieved may also be presented to the user to enhance the appearance of an Always Available Location. When a second portion (e.g., "New York City, New York, United States") associated with a higher accuracy became available, the second portion replaced the first portion (e.g., "New York, United States") as demonstrated in interface 503. The second portion is with respect to the accuracy of the determined location (e.g., coordinates 509) provided in the request for the second portion. Similarly, when a third portion (e.g., "550 Park Street, New York City, New York, United States") associated with a higher accuracy became available, the third portion replaced the second portion as demonstrated in interface 505. The third portion is with respect to the accuracy of the determined location (e.g., coordinates 511) provided in the request for the third portion. As previously mentioned, when higher accuracy portion of the location information replaces a lower accuracy portion, it may give a user the appearance that the application or the device is working as it should, and thus, improving user perceived performance.

FIG. 5B illustrates two user interfaces (e.g., interfaces 531 and 533), two determined locations with various accuracies (e.g., coordinates 535 and 537), and a time frame 539. As shown in interfaces 531 and 533, the user interfaces express the user's current location (e.g., determined location) associated with the device (e.g., obtained through a GPS receiver) in geographic coordinates in decimal format, [40.764604, −73.968902]. In each user interface, the user has the option to change the settings associated with the particular application and to close the application by clicking "Done". Moreover, the user has the ability share the user's reverse geo-coded information. However, the reversed geo-coded information provided is different in each of the interfaces shown.

As shown in the interface 531, the highest accuracy level initially discovered in the cache memory of the device with respect to portions of the location information for the current location of the device was "New York, United States". However, as demonstrated by the interface 533 and the time frame 539, there was a second portion (e.g., "550 Park Street, New York City, New York, United States") associated with a higher accuracy level identified in the cache memory sometime shortly after the discovery of the first portion (e.g., "New York, United States"). Accordingly, the second portion immediately replaced the first portion without a noticeable delay (e.g., 0 seconds). In this situation, there was not only an appearance of improved performance, but an actual reduction in the overall latency in comparison to a typical conversion with respect to reverse geo-coding.

FIG. 5C illustrates four user interfaces (e.g., interfaces 551, 553, 555, and 557) and four determined locations with various accuracies (e.g., coordinates 559, 561, 563, and 559). As shown in interfaces 551, 553, 555, and 557, the user interfaces express the user's current location (e.g., determined location) associated with the device (e.g., obtained through a GPS receiver) in geographic coordinates in decimal format, [40.702864, −74.014326]. In each user interface, the user has the option to change the settings associated with the particular application and to close the application by clicking "Done". Moreover, the user has the ability share the user's geo-tagged images depicting the location and the accuracy level with which the image is associated. However, the geo-tagged image provided is different in each of the interfaces shown.

As shown in interface 551, the highest accuracy level available in the cache memory of the device with respect to portions of the location information for the current location of the device was the geo-tagged image of the United States. As such, simultaneous requests for portions of the location information (e.g., reversed geo-coded information) were made with respect to determined locations with varying accuracies so that the portion of the location information associated with the highest available accuracy at any particular time would be displayed to the user. It is noted that an indicator (not shown) illustrating that higher accuracy portions are being retrieved may also be presented to the user to enhance the appearance of an Always Available Location. When a second portion (e.g., geo-tagged image of New York, United States) associated with a higher accuracy became available, the second portion replaced the first portion (e.g., geo-tagged image of the United States) as demonstrated in interface 553. The second portion is with respect to the accuracy of the determined location (e.g., coordinates 561) provided in the request for the second portion. Similarly, when a third portion (e.g., geo-tagged image of Ellis Island, N.Y., United States) associated with a higher accuracy became available, the third portion replaced the second portion as demonstrated in interface 555. The third portion is with respect to the accuracy of the determined location (e.g., coordinates 563) provided in the request for the third portion. Additionally, when a fourth portion (e.g., geo-tagged image of the Statue of Liberty (located at Liberty Island, N.Y., United States)) associated with a higher accuracy became available, the fourth portion replaced the third portion as demonstrated in interface 557. The fourth portion is with respect to the accuracy of the determined location (e.g., coordinates 565) provided in the request for the third portion. As previously mentioned, when higher accuracy portion of the location information replaces a lower accuracy portion, it may give a user the appearance that the application or the device is working as it should, and thus, improving user perceived performance.

The processes described herein for pre-fetching location information may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
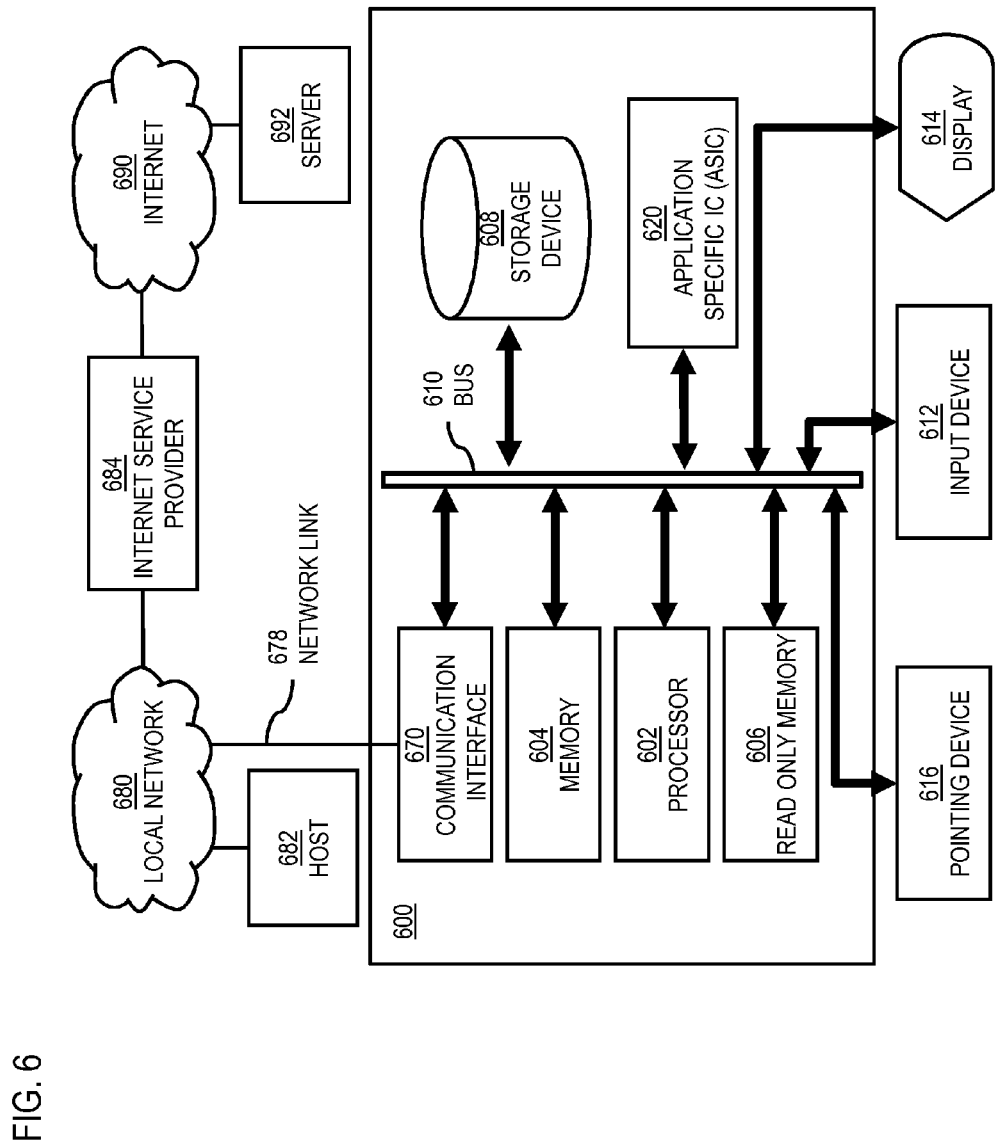
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to pre-fetch location information as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of pre-fetching location information.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to pre-fetch location information. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or any other dynamic storage device, stores information including processor instructions for pre-fetching location information. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or any other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for pre-fetching location information, is provided to the bus 610 for use by the processor from an external input device 612, such as a keyboard containing alphanumeric keys operated by a human user, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT), a liquid crystal display (LCD), a light emitting diode (LED) display, an organic LED (OLED) display, a plasma screen, or a printer for presenting text or images, and a pointing device 616, such as a mouse, a trackball, cursor direction keys, or a motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of ASICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for pre-fetching location information to the UE 101.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or any other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set or chip 700 upon which an embodiment of the invention may be implemented. Chip set 700 is programmed to pre-fetch location information as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of functions. Chip set or chip 700, or a portion thereof, constitutes a means for performing one or more steps of pre-fetch location information.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to pre-fetch location information. The memory 705 also stores the data associated with or generated by the execution of the inventive steps.

Figure 8:
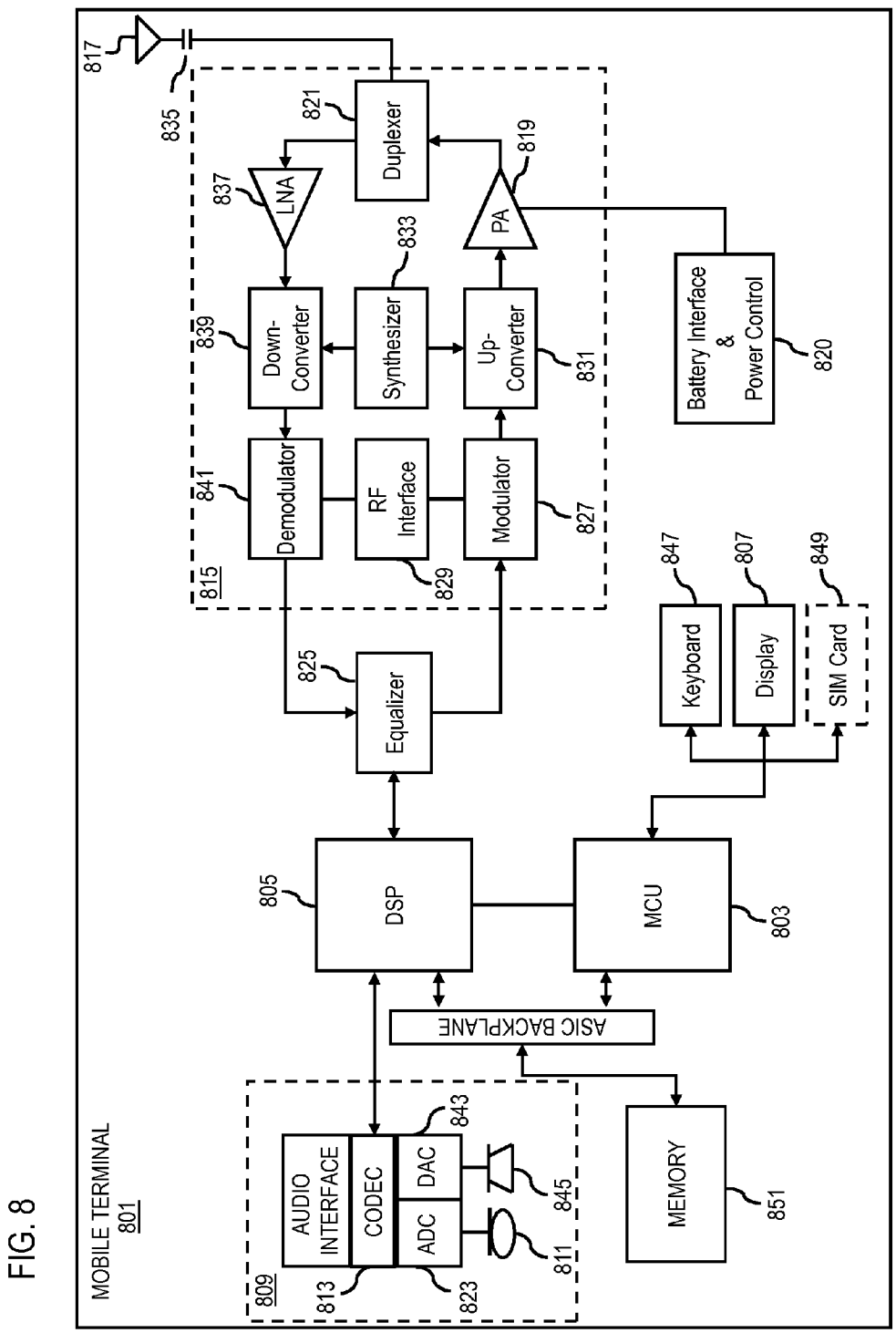
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 801, or a portion thereof, constitutes a means for performing one or more steps of pre-fetching location information. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of pre-fetching location information. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803 which can be implemented as a Central Processing Unit (CPU) (not shown).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to pre-fetch location information. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

We claim:

1. A method comprising:
   predicting a location associated with a device;
   generating a hierarchy of location information with respect to a plurality of accuracy levels, including generating at least one hierarchically lower accuracy position at a time of generating a hierarchically higher accuracy position with respect to the predicted location;
   storing the hierarchy of location information at the device; and
   displaying current location information of the device based, at least in part, on a highest accuracy position of the stored hierarchy of location information.

2. A method of claim 1, wherein the location information is reverse geo-coded information.

3. A method of claim 1, further comprising:
   receiving a request for at least a portion of the location information, the request specifying at least in part a determined location of the device;
   determining the at least a portion of the location information based, at least in part, on the determined location, an accuracy associated with the determined location, or a combination thereof.

4. A method of claim 1, further comprising:
   determining the predicted location based, at least in part, on a current location of the device, context information associated with the device, a history of locations associated with the device, or a combination thereof.

5. A method of claim 1, further comprising:
   determining a planned route of travel based, at least in part, on an application, a service, or a combination thereof associated with the device; and
   determining the predicted location based, at least in part, on the planned route of travel.

6. A method of claim 1, further comprising:
   determining at least one event associated with the device; and
   locally and/or remotely determining actions that result in the determination of the predicted location, the determination to retrieve the location information, the determination to cache the location information, or a combination thereof based, at least in part, on the at least one event.

7. A method of claim 1, further comprising:
   determining one or more location-based applications executing on the device; and
   determining the predicted location, at least a portion of the location information, or a combination thereof based, at least in part, on the one or more location-based applications.

8. A method of claims 1, further comprising:
   acting on an execution of one or more location-based applications;

at least one determination of at least a portion of the location information based, at least in part, on available information regarding a current location of the device; and providing the at least a portion of the location information to the one or more location-based applications.

9. An apparatus comprising:

at least one processor; and at least one memory including computer program code for one or more programs, the at least one memory and the computer program code configured to, with the at least one processor, cause the apparatus to perform at least the following, determine a predicted location associated with a device;

determine a hierarchy of location information with respect to a plurality of accuracy levels, including determine at least one hierarchically lower accuracy position at a time of determine a hierarchically higher accuracy position with respect to the predicted location;

to store the hierarchy of location information at the device; and display a current location information of the device based, at least in part, on a highest accuracy position of the stored hierarchy of location information.

10. An apparatus of claim 9, wherein the location information is reverse geo-coded information.

11. An apparatus of claim 9, wherein the plurality of accuracy levels of the hierarchy is associated with respective granularities of the predicted location.

12. An apparatus of claim 9, wherein the apparatus is further caused to:

receive a request for at least a portion of the location information, the request specifying at least in part a determined location of the device; and determine the at least a portion of the location information based, at least in part, on the determined location, an accuracy associated with the determined location, or a combination thereof.

13. An apparatus of claim 12, wherein the apparatus is further caused to:

determine at least one change to the accuracy associated with the determined location; and determine to update the at least a portion of the location information based, at least in part, on the at least one change.

14. An apparatus of claim 9, wherein the apparatus is further caused to:

determine the predicted location based, at least in part, on a current location of the device, context information associated with the device, a history of locations associated with the device, or a combination thereof.

15. An apparatus of claim 9, wherein the apparatus is further caused to:

determine a planned route of travel based, at least in part, on an application, a service, or a combination thereof associated with the device; and determine the predicted location based, at least in part, on the planned route of travel.

16. An apparatus of claim 9, wherein the apparatus is further caused to:

determine an event associated with the device; and cause, at least in part, actions that result in the determination of the predicted location, the determination to retrieve the location information, the determination to cache the location information, or a combination thereof based, at least in part, on the event.

17. An apparatus of claim 16, wherein the event includes, at least in part, an initial use of the device, an activation of the device, a change in an online status of the device, a change in an operator network associated with the device, or a combination thereof.

18. An apparatus of claim 9, wherein the apparatus is further caused to:

determine one or more location-based applications executing at the device; and determine the predicted location, at least a portion of the location information, or a combination thereof based, at least in part, on the one or more location-based applications.

19. An apparatus of claim 9, wherein the apparatus is further caused to:

act on an execution of one or more location-based applications;

determine at least a portion of the location information based, at least in part, on available information regarding a current location of the device; and provide the at least a portion of the location information to the one or more location-based applications.

20. An apparatus of claim 19, wherein the apparatus is further caused to:

determine respective activity states of the one or more location-based applications; and cause, at least in part, actions that result in the determination of the at least a portion of the location information, the the at least a portion of the location information, or a combination thereof based, at least in part, on the respective activity states.

21. An apparatus of claim 9, wherein the apparatus is a mobile phone further comprising:

user interface circuitry and user interface software configured to facilitate user control of at least some functions of the mobile phone through use of a display and configured to respond to user input; and a display and display circuitry configured to display at least a portion of a user interface of the mobile phone, the display and display circuitry configured to facilitate user control of at least some functions of the mobile phone.

* * * * *